United States Patent [19]

Stuchlik, III

[11] Patent Number: 4,907,711
[45] Date of Patent: Mar. 13, 1990

[54] OUTLET BOX COVERS WITH LOCATION INDICATORS FOR WALL COVERING

[76] Inventor: Charles F. Stuchlik, III, R.D. 1 - Box 304 B, Milton, Del. 19968

[21] Appl. No.: 267,270

[22] Filed: Nov. 4, 1988

[51] Int. Cl.⁴ .................................................. H02G 3/08
[52] U.S. Cl. ............................................. 220/3.8; 220/3.4
[58] Field of Search ................... 220/3.3, 3.4, 3.5, 3.6, 220/3.8; 174/53, 55, 56, 58, 66, 67

[56] References Cited

U.S. PATENT DOCUMENTS

| | | | |
|---|---|---|---|
| 1,550,870 | 8/1925 | Braden | 220/3.4 |
| 2,775,812 | 1/1957 | Mohr | 220/3.4 X |
| 2,788,151 | 4/1957 | Shore | 220/3.8 X |
| 2,815,144 | 12/1957 | Kullander | 220/3.4 |
| 2,867,349 | 1/1959 | Parker, Jr. | 220/3.3 |
| 2,895,634 | 7/1959 | Comroe | 220/3.4 |
| 2,898,688 | 8/1959 | Cottar | 220/3.8 X |
| 3,015,408 | 1/1962 | Campbell et al. | 220/3.4 |
| 3,061,083 | 10/1962 | Hubbell, Jr. | 220/3.4 X |
| 3,251,130 | 5/1966 | Miles | 220/3.4 X |
| 3,260,400 | 7/1966 | Miles | 220/3.4 |
| 3,376,993 | 4/1968 | Javner | 220/3.4 |
| 3,601,276 | 8/1971 | Culpepper | 220/3.8 |
| 4,023,697 | 5/1977 | Marrero | 220/3.4 |
| 4,176,758 | 12/1979 | Glick | 220/3.3 |
| 4,209,103 | 6/1980 | Glovier | 220/3.4 |
| 4,605,139 | 8/1986 | Dacar | 220/3.4 |

FOREIGN PATENT DOCUMENTS 7802717  8/1979  France .
621049  8/1979  U.S.S.R. .

Primary Examiner—John Rivell
Attorney, Agent, or Firm—Oliff & Berridge

[57] ABSTRACT

A protective cover for electrical outlet boxes and the like which prevents the outlet box from being covered during installation of drywall and prevents entry of debris into the outlet box while permitting the interior of the outlet box to be readily accessible. The cover is provided with projections extending from the cover for indicating the location of the outlet box in the drywall, prior to being covered by the drywall while also providing a manner in which to mark reference points on the drywall for subsequent cutting. The cover can be of a reusable form or can be integrally molded with the outlet box.

20 Claims, 3 Drawing Sheets

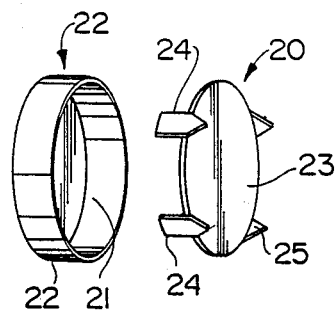
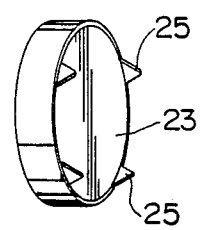
Fig. 5a  Fig. 5b
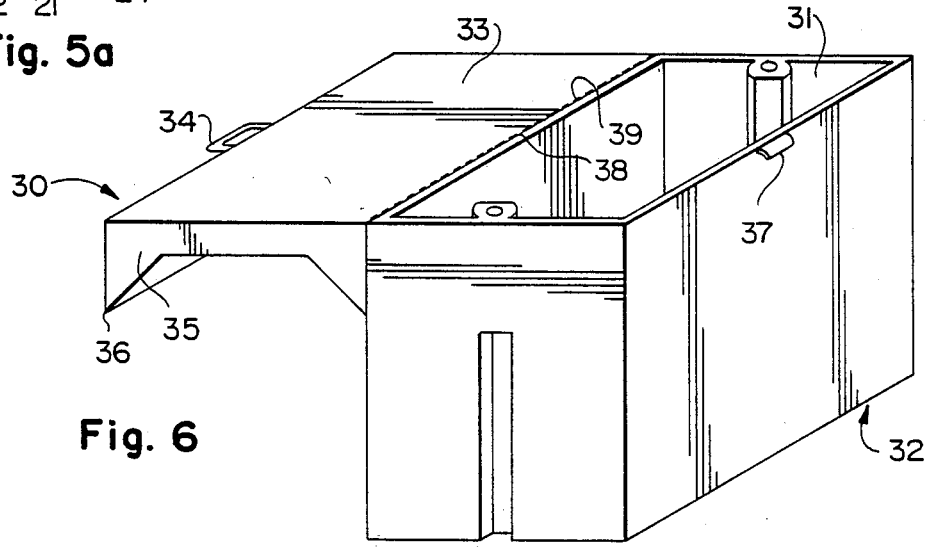
Fig. 6
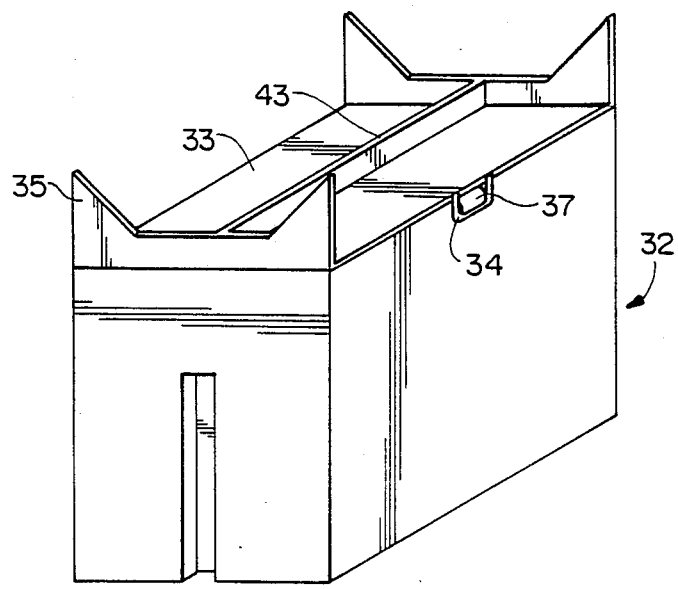
Fig. 7

OUTLET BOX COVERS WITH LOCATION INDICATORS FOR WALL COVERING

BACKGROUND OF THE INVENTION

The present invention relates to outlet box covers for protecting outlet boxes, and wires contained therein, from entry of construction material and other debris while permitting wall coverings, such as drywall and the like to be marked for identifying the location of the outlet box for subsequent cutting.

In the construction of homes, offices, and the like where electrical outlet boxes are installed, problems occur during construction resulting in damage to or covering of outlet boxes and wires contained therein. The boxes are readily filled or covered with joint compound, drywall and wall panelling due to subsequent construction steps after the boxes are installed.

Typically, in the construction of residential homes, plastic electrical boxes are nailed or secured to wall support studs which are wired before drywall, panelling or the like is applied to the support studs. The wiring connections pertaining to the circuitry in each box are performed, and the wires are then pushed back into the box which is left open. An inspection of the wiring is then performed. Subsequently, the drywall installer begins hanging drywall which covers the electrical boxes. The average number of electrical boxes covered in the average house is from 4 to 6. It is very time consuming and costly trying to locate these boxes once covered by drywall. When the drywallers attempt to locate the covered boxes, it is usually done with a sharp punch. After locating the box, the drywaller cuts an opening in the drywall using the inside of the box as a guide to cut out the drywall. Inevitably, this results in the insulation of the wires as well as the wires themselves being cut and damaged. Repairing the damaged wiring becomes very time consuming and costly.

Further problems are encounted after the drywall is cut for the outlet boxes. Invariably, the open electrical boxes become filled with joint compound used for tapping the joints between the boxes and the hung drywall. The joint compound which enters the electrical box hardens on the wiring. The electrician then must scrape off the joint compound without damaging the wires so that he can determine the color of the wires in order to find the active circuits and the ground wires. Again, the expense and time associated with removing joint compound and other debris in the outlet box is undesirable.

Some devices for covering outlet boxes have been proposed. However, these devices suffer from a number of disadvantages. For example, U.S. Pat. No. 3,601,276 to Culpepper discloses a cover for protecting metal electrical receptacle boxes against the entry of plaster during plastering of building walls. The cover is formed as an integral body of deformable sheet material having a rectangular panel portion for covering the front opening of the box with its lateral edges fitting within the opening. Bendable fastening means are provided for fastening the cover to mounting ears. However, because Inspectors must be able to fully visually inspect the wires in the box, an opening is provided in the cover which inevitably results in the entry of undesirable debris. Furthermore, such a cover is made from easily bendable material, which may lead to the cover being collapsed into the outlet box when a piece of drywall is placed against the cover. Thus, the purpose of protecting the outlet box is not always achieved.

U.S. Pat. No. 2,895,634 to Comroe discloses a plaster protection plate which completely covers steel or metal electric connection boxes prior to plastering. However, an electrical inspector cannot readily view the wiring in the box due to the plate being mounted by screws. Furthermore, after the plaster hardens, the cover becomes difficult to remove.

U.S. Pat. No. 3,061,083 to Hubbell and U.S. Pat. No. 1,550,870 to Braden also show covers for steel or metal outlet boxes. However, such covers are inevitably covered by plaster and subsequently difficult to locate due to their substantially flat configurations.

Thus, it is desirable to provide a cover for electrical outlet boxes for preventing entry of undesirable debris while indicating the location of the outlet box in the drywall so that the drywall can be cut to readily expose the outlet box. It will be appreciated that the prior art fails to disclose a truly convenient and advantageous cover for electrical outlet boxes which can be readily removed without tools and which will also assist in the installation of drywall, panelling and the like.

SUMMARY OF THE INVENTION

Accordingly, it is an object of the present invention to provide a new and useful protective cover for outlet boxes, which protective cover overcomes the shortcomings of the prior art.

It is object of the present invention to provide a cover for outlet boxes which will prevent the entry of debris into the outlet box while also allowing for the interior of the box to be readily accessible.

It is another object of the present invention to provide a protective cover for an outlet box which cover allows for quick and easy access to the interior of the box without tools.

It is yet another object of the present invention to provide a protective cover for an outlet box which will prevent the outlet box from being covered by drywall, panelling and the like and which can locate a position in the drywall so that the drywall can be pre-cut to expose the outlet box.

It is also an object of the present invention to provide a protective cover which is capable of marking wall material for accurate cutting of an opening for the outlet box in the wall material.

It is a further object of the present invention to provide a protective cover which is reusable and removable.

Yet another object of the present invention is to provide an outlet box integrally molded with a protective cover having projections for preventing the box from being covered.

The foregoing objects and others are achieved by providing a protective cover for outlet boxes and the like which prevents entry of debris into the box while permitting easy access to the interior of the box. The cover is further provided with projections for indicating the location of the outlet box in the drywall while preventing outlet box from being covered by the drywall. The projections also provide means for marking the drywall for subsequent cutting. The cover may be made in a reusable form or may be integrally molded to the outlet box.

BRIEF DESCRIPTION OF THE DRAWINGS

For a better understanding of the structure, advantages and further features of the protective cover of the present invention, reference is made to the accompanying drawings, wherein:

FIGS. 5(a) and (b) show yet another embodiment of the present invention;

FIG. 6 is a perspective view of an embodiment of the present invention showing a protective cover integrally molded to an outlet box;

FIG. 7 is another perspective view of the outlet box and protective cover of FIG. 6.

DETAILED DESCRIPTION OF THE INVENTION

Figure 1:
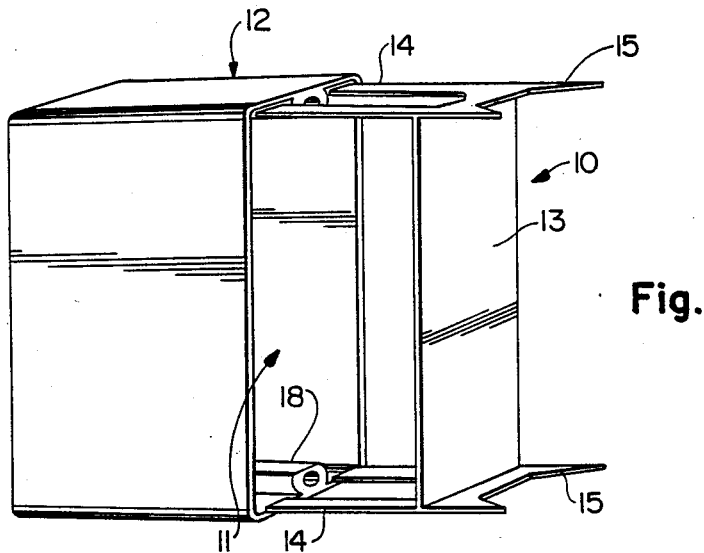
FIG. 1 is an exploded perspective view of an embodiment of the present invention showing the protective cover in relation to the outlet box.
Figure 2:
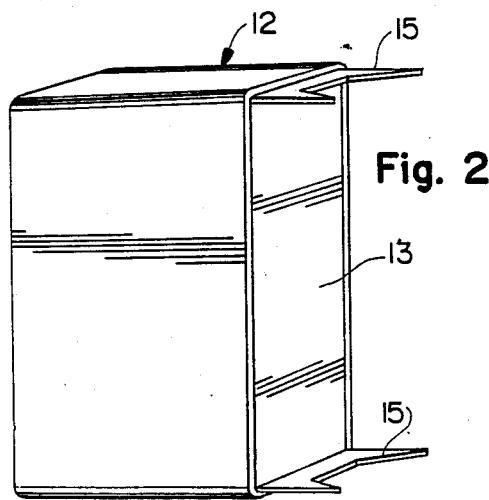
FIG. 2 is a perspective view of FIG. 1 showing the protective cover of the present invention in position on the outlet box.

One preferred embodiment of the present invention is shown in FIGS. 1 and 2. FIG. 1 shows an embodiment of the present invention wherein a reusable, removable protective cover 10 is provided for an outlet box 12. The protective cover 10 is made of a relatively stiff material such as aluminum or plastic, but is preferably made of a resilient metal such as spring steel. The protective cover comprises a substantially flat cover plate 13 having dimensions which completely cover an opening 11 of the outlet box 12.

The protective cover 10 further comprises legs 14 which are adapted to slidably fit against the inside surfaces of the outlet box 12. The legs 14 are preferably resilient so that the protective cover 10 can be securely held in the outlet box 12. By providing resilient legs, the legs will bend inwardly when inserted into the interior of the box 12. The resiliency of the legs 14 causes the legs to press against the inside surfaces of the box such that the cover 10 is held in place while still being easily removable.

It should be realized that any number of legs 14 may be provided in any number of positions along the periphery of the protective cover 10 for holding the protective cover on the outlet box 12. In a preferred embodiment, a pair of two flat, substantially two-dimensional legs are provided on a top and a bottom portion of the cover plate as shown in FIG. 1. By providing two legs on each of the top and bottom portions of the cover plate 13, a space is left for the legs to pass around mounting ears 18 which may be centrally located along the periphery of the box 12. It is not necessary that mounting ears 18 be provided. Of course, the number of legs provided will depend upon the size and shape of the box, and is chosen accordingly to provide an arrangement which will adequately hold the cover 10 on the box. For example, two legs may be provided on diametrically opposite ends on either the top and bottom portions or on the side portions of the cover plate.

Figure 4:
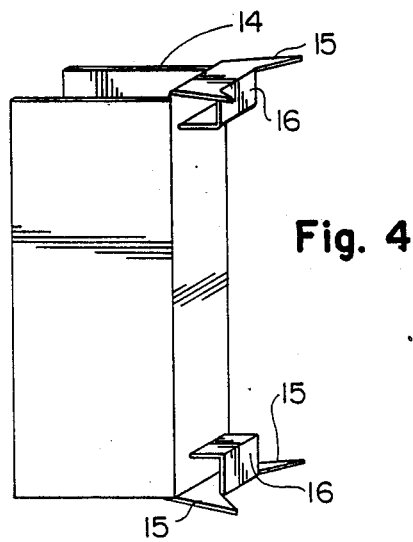
FIG. 4 is a perspective view of a further embodiment of the invention.

The protective cover 10 also comprises projections 15 which project from the opposite side of the protective cover as the legs 14 (i.e., away from the outlet box). The projections 15 indicate the location of the outlet box in the drywall prior to being covered by drywall, panelling and the like. The projections preferably are provided with pointed ends which are capable of making marks on the interior surface of the drywall such that the marks can be used as reference points for subsequent cutting of an opening in the drywall to expose the outlet box. When such pointed ends are provided for marking the drywall, it is possible that the projections will puncture the drywall completely and the outlet box covered. Preferably, a flange 16 (as shown in FIG. 4) is provided to prevent the projections 15 puncturing completely through the drywall. The flanges 16 thus prevent the outlet box from being completely covered by drywall.

Any number of projections 15 can be provided on the outer facing side of the cover plate 13. Preferably, four projections 15 are provided, having the pointed ends corresponding to the corners of the cover plate 13 which in turn correspond to the outside dimensions of the box 12 as shown in FIGS. 1 and 2. The pointed ends can thus mark the interior surface of a sheet of drywall corresponding to the dimensions of the outlet box 12. These marks provide reference points for cutting an opening in the drywall of the appropriate size prior to hanging the drywall, thereby avoiding damage to the box and wires and saving the cutter considerable time in locating the position on the drywall corresponding to the proper outlet box opening.

The cover operates as follows. With the protective cover 10 in place an electrician is allowed to inspect the wiring by simply removing the cover. No tools are necessary to remove the cover 10. When the electrician is finished, the cover can be readily replaced. Afterward, when the drywall is hung, the drywallers can readily determine the location of the outlet boxes prior to covering the outlet boxes by pressing the drywall against the projections 15, thus marking the drywall and locating the periphery of the outlet box. The drywall is then cut using the reference marks made by the projections 15 to provide an opening corresponding to the location of the outlet box. Now the drywall can be hung having openings through which the projections 15 pass i.e., the drywall has openings aligned with the outlet box and corresponding in size. Accordingly, much time and expense is saved, and the outlet boxes are not covered by the drywall. Furthermore, the wires contained in the box are protected from damage. When construction is completed, the covers 10 can be removed and used again.

Figure 3A:
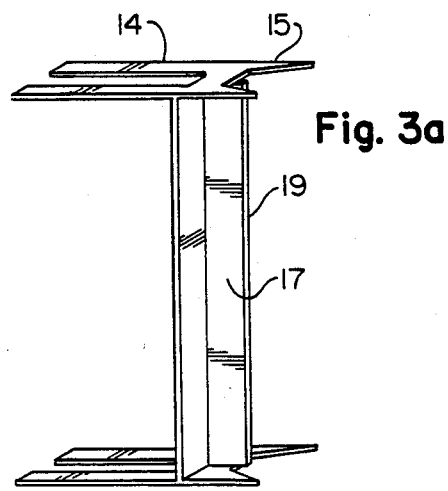
FIG. 3(a) and 3(b) are perspective views of embodiments of the protective cover of the present invention.
Figure 3B:
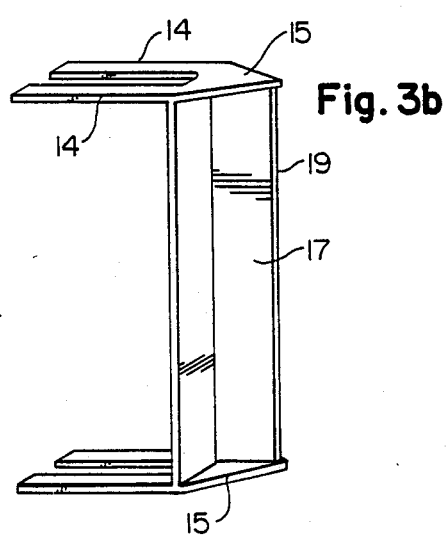

FIGS. 3(a), 3(b) and 4 show further embodiments of the reusable protective cover of the present invention. In FIG. 3(a), a central longitudinal rib 17 extends between pairs of projections 15. The projections extend further outwardly than an outermost edge 19 of the rib 17 so that the projections are allowed to mark the drywall. The rib 17 provides added support for the protective cover 10, as well as providing for a convenient means for handling the protective cover during installation and removal from the outlet box. Further, the rib 17 can function to prevent complete covering of the box by drywall by preventing the projections 15 from puncturing completely through the dry wall. FIG. 3(b) shows a protective cover wherein a projection 15 is provided on opposing ends of the cover plate, and having a rib 17 extending therebetween. FIG. 4 shows a protective cover having two longitudinal legs 14 and flanges 16.

It will be evident that the protective covers of the present invention cannot only be used for any number of different sized boxes, e.g., single gang or up to four gang, but also may be used for protecting openings of various shapes. FIGS. 5(a) and 5(b) show an embodiment of a circular protective cover 20 for covering circular openings. The circular protective cover 20 comprises a cover plate 23 substantially the same size as an opening 21 of a circular box 22 to be covered. Resilient legs 24 extend from a side of the cover plate 23 which conform to the inside surface of the circular box 22. The resilient legs 24 slidably engage with the inside surface of the circular box so that the cover 20 can be held in position without other holding means. One continuous leg extending substantially or completely around the outer periphery of the cover plate 23 may be provided for holding the cover 20 in place over the circular box 22. However, any number of legs can be provided, as desired, provided that sufficient support is imparted for holding the cover 20 in place.

Projections 25 extend in a direction opposite to that of the legs 24. Any number of legs 24 and projections 25 may be provided. A different number of projections 25 than legs 24 may be provided as necessary in different positions on the outer periphery of the cover plate 21. Preferably, three or more projections 25 are provided so that a sufficient number of reference marks can be made on the drywall for assisting in the cutting of the drywall.

Reference will be made now to another embodiment of the present invention wherein an outlet box assembly is provided comprising a protective cover integrally molded to an outlet box. In this embodiment, the outlet box and cover are preferably made of thermoplastic resins, such as polyvinylchloride. FIGS. 6 and 7 show a protective cover 30 integrally molded to one side of an outlet box 32. The protective cover 30 comprises a cover plate 33 of dimensions which cover an opening 31 of the outlet box 32. The protective cover 30 and the outlet box 32 are connected through a thin strip which acts as a hinge 38. The hinge 38 may be provided with perforations 39 so that the protective cover 30 can be easily separated from the outlet box after use.

The protective cover shown in FIGS. 6 and 7 further includes external latching means comprising a female connector 34 adapted to engage with a male connector 37 on the outlet box 32. The female connector is resilient so that the female connector can flexibly bend over the male connector 37 and bend back to its original position to securely hold the cover 30 in a closed position. Alternatively, the female connector 34 can be provided on the outlet box 32 and the male connector can be provided on the cover 30, if desired.

The protective cover 30 is further provided with projections 35 having pointed ends. A rib 43 preferably extends between the projections 35. When the protective cover 30 is in the closed position of the outlet box 32, the interior of the outlet box 32 is protected from entry of undesirable debris. Also, the box cannot be covered by drywall due to the projections 35. In this regard, the pointed ends of the projections 35 are capable of making indentations or marks on the drywall for assisting in cutting an opening of the correct dimensions for the outlet box.

Figure 8:
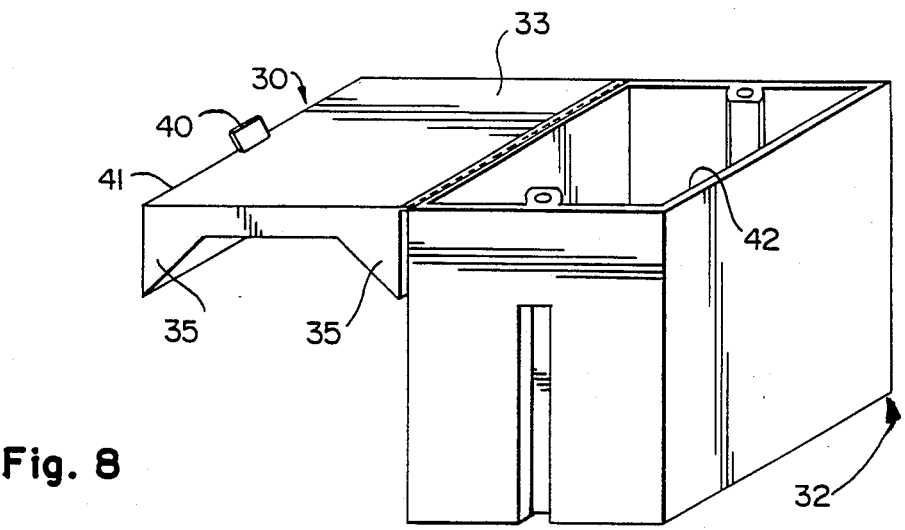
FIGS. 8 and 9 show further embodiments of the protective cover of the present invention.

FIG. 8 shows an alternative embodiment of the outlet box assembly of the present invention wherein internal latching means are provided. As opposed to the embodiment shown in FIGS. 6 and 7, a latch 40 is provided on the opposite side of the protective cover 30 as the projections 35. The latch 40 is essentially rib-like and extends substantially parallel to the edge 41 of the cover 30. The latch 40 is positioned so that frictional engagement occurs with an inside wall 42 of the box 32 when the cover 30 is in the closed position. Thus, the cover 30 can be held in a closed position without external latching means due to the frictional engagement between the latch 40 and inside wall 42.

Figure 9:
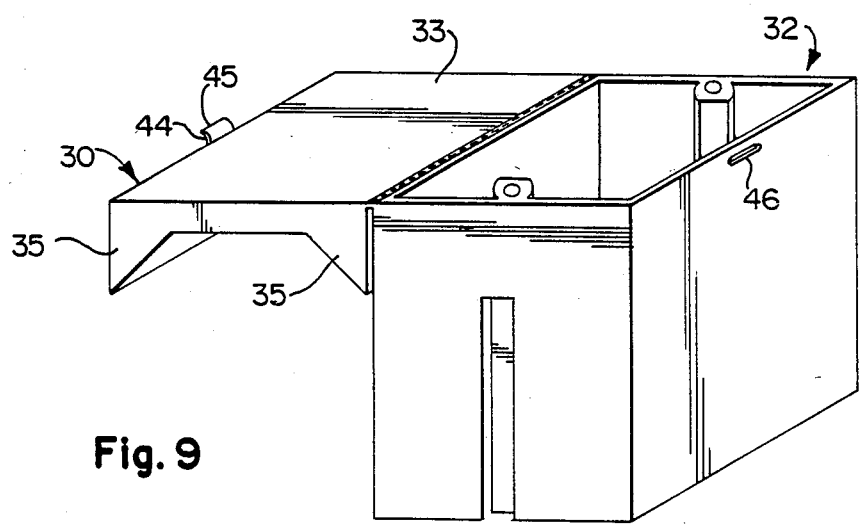

FIG. 9 shows yet another embodiment of the outlet box assembly of the present invention wherein the internal latching means comprises a latch 44 having a flanged end portion 45. The flanged end 45 engages with an opening 46 when the cover 30 is in the closed position. A slight resiliency between the latch 44 and the wall of the outlet box allows for the cover to remain securely in the closed position. When the cover is pulled to the open position, the flanged end portion 45 bends the wall surrounding the opening 46 outwardly such that the cover is released. Of course, the latch 44 may be provided with resiliency for bending engagement with the opening 46.

In the above embodiments, when construction is complete, the protective cover 30 can be cut or torn from the outlet box along the perforations 39 in the hinge 38. Thus, the outlet box 32 is left uncovered without damage to any wires contained therein.

Although the present invention has been described in considerable detail with reference to specific embodiments thereof, it is to be understood that modifications can be made without departing from the spirit and scope of the present invention as described above and as claimed in the following claims. For example, the invention has been described for use in drywall operations. However, those skilled in the art recognize that the invention can be employed in any wall covering operation or in any environment where a first surface has an opening and be subsequently applied second surface must be cut to form a corresponding aligned opening to expose the corresponding underlying opening in the first surface. In addition, the projections 15 need not have pointed ends, but merely some mechanism to delineate by marking the opening to be formed in the subsequently applied surface.

What is claimed is:

1. A protective cover for covering an opening, comprising:
a cover plate having dimensions corresponding to the dimensions of the opening;
at least two projections extending from said cover plate in a first direction away from said opening for preventing said cover plate from being covered;
at least one handling member extending from said cover plate between said at least two projections;
at least one leg portion extending from said cover plate in a direction opposite to said at least one projection;
said leg portion slidably engaging with inside surfaces of the opening such that the cover plate is securely held in position covering the opening.

2. The protective cover of claim 1, wherein said cover plate is rectangular.

3. The protective cover of claim 2, comprising two flat, substantially two-dimensional leg portions disposed on opposite ends of said cover plate.

4. The protective cover of claim 2, comprising a pair of two flat, substantially two-dimensional leg portions disposed on opposite ends of said cover plate.

5. The protective cover of claim 2, wherein said leg portion extends around the periphery of said cover plate.

6. The protective cover of claim 2, wherein said at least two projections are disposed on opposite ends of said cover plate.

7. The protective cover of claim 2, comprising a projection disposed on corners of said rectangular cover plate, each projection having a pointed end.

8. The protective cover of claim 2, comprising a rib extending between at least two projections located at opposite ends of said cover plate.

9. The protective cover of claim 1, wherein the cover plate is circular.

10. The protective cover of claim 9, wherein said leg portion extends around the periphery of said cover plate.

11. The protective cover of claim 1, wherein said handling member is a rib extending in a longitudinal direction of said cover plate.

12. The protective cover of claim 1, wherein said handling member is at least one flange located at at least one end of said cover plate.

13. An outlet box assembly, comprising:
an outlet box having an open front face;
a substantially flat cover for covering said open front face, said cover being integrally molded with the outlet box through a hinge portion such that the cover can move between an open position and a closed position; and
at least one projection extending perpendicularly outward from the cover in the closed position.

14. The outlet box assembly of claim 13, further comprising a connector on said outlet box for engaging with a corresponding connector on the cover, for holding said cover in the closed position.

15. The outlet box assembly of claim 13, wherein said cover is rectangular.

16. The outlet box assembly of claim 15, comprising two projections disposed on opposite ends of said cover.

17. The outlet box assembly of claim 15, wherein said at least one projection is disposed on a corner of said rectangular cover, said projection having a pointed end.

18. The outlet box assembly of claim 15, wherein a rib extends between at least two projections located at opposite ends of said cover.

19. The outlet box assembly of claim 13, wherein said hinge portion is provided with perforations.

20. A protective cover for covering an opening in a first surface subsequently exposed through an aligned opening in a second surface, the protective cover comprising:
a cover plate having dimensions commensurate with the dimensions of the opening in the first surface;
support means extending from the cover in a first direction for engaging an inner periphery of the opening to support the cover over the opening;
location indicator means extending from the cover in a second direction opposite to the first direction for indicating the location of a corresponding aligned opening to be formed in the second surface subsequently applied over the first surface; and
handling means extending from the cover between portions of said location indicator means for handling the cover.

* * * * *